United States Patent
Sankaran et al.

(10) Patent No.: US 9,590,699 B1
(45) Date of Patent: Mar. 7, 2017

(54) GUIDED NEAR FIELD COMMUNICATION FOR SHORT RANGE DATA COMMUNICATION

(71) Applicants: Texas Instruments Incorporated, Dallas, TX (US); Texas Instruments Deutschland GMBH, Freising (DE)

(72) Inventors: Swaminathan Sankaran, Allen, TX (US); Bradley Allen Kramer, Plano, TX (US); Benjamin Stassen Cook, Dallas, TX (US); Juan Alejandro Herbsommer, Allen, TX (US); Lutz Naumann, Gledern (DE); Mark W. Morgan, Allen, TX (US); Baher Haroun, U, TX (US)

(73) Assignees: TEXAS INSTUMENTS INCORPORATED, Dallas, TX (US); TEXAS INSTRUMENTS DEUTSCHLAND GMBH, Freising (DE)

(*) Notice: Subject to any disclaimer, the term of this patent is extended or adjusted under 35 U.S.C. 154(b) by 0 days.

(21) Appl. No.: 14/970,315

(22) Filed: Dec. 15, 2015

Related U.S. Application Data

(60) Provisional application No. 62/217,594, filed on Sep. 11, 2015.

(51) Int. Cl.
*H04B 5/00* (2006.01)
*H04W 4/00* (2009.01)

(52) U.S. Cl.
CPC ......... *H04B 5/0031* (2013.01); *H04B 5/0075* (2013.01); *H04W 4/008* (2013.01)

(58) Field of Classification Search
None
See application file for complete search history.

(56) References Cited

U.S. PATENT DOCUMENTS

| 6,308,894 B1* | 10/2001 | Hirai | B29C 45/14647 |
| | | | 235/487 |
| 8,655,274 B2* | 2/2014 | Walker | G06K 19/07327 |
| | | | 156/107 |
| 8,744,529 B2* | 6/2014 | Freund | H04M 1/0206 |
| | | | 455/566 |

(Continued)

OTHER PUBLICATIONS

"Programmable logic controller", Wikipedia, available at https://en.wikipedia.org/wiki/Programmable_logic_controller on Dec. 2, 2015, pp. 1-10.

(Continued)

*Primary Examiner* — Tuan A Tran
(74) *Attorney, Agent, or Firm* — John R. Pessetto; Charles A. Brill; Frank D. Cimino (57) ABSTRACT

A system is provided in which a set of modules each have a substrate on which is mounted a radio frequency (RF) transmitter and/or an RF receiver coupled to a near field communication (NFC) coupler located on the substrate. Each module has a housing that surrounds and encloses the substrate. The housing has a port region on a surface of the housing. Each module has a field confiner located between the NFC coupler and the port region on the housing configured to guide electromagnetic energy emanated from the NFC coupler through the port region to a port region of an adjacent module.

2 Claims, 9 Drawing Sheets

(56) References Cited

U.S. PATENT DOCUMENTS

| | | | | |
|---|---|---|---|---|
| 8,843,062 B2* | 9/2014 | Narendra | ............... | H01Q 1/48 |
| | | | | 340/13.24 |
| 8,983,399 B2* | 3/2015 | Kawamura | ............ | H01L 23/48 |
| | | | | 257/777 |
| 2013/0244577 A1* | 9/2013 | Cheikh | ............. | G07C 9/00309 |
| | | | | 455/41.1 |
| 2014/0091758 A1* | 4/2014 | Hidaka | ................ | H01F 38/14 |
| | | | | 320/108 |
| 2014/0346886 A1* | 11/2014 | Yang | .............. | G06K 19/07779 |
| | | | | 307/104 |
| 2015/0145736 A1* | 5/2015 | Lin | ......................... | H01Q 1/38 |
| | | | | 343/742 |

OTHER PUBLICATIONS

"Metamaterial", Wikipedia, available at https://en.wikipedia.org/Metamaterial on Dec. 4, 2015, pp. 1-15.

\* cited by examiner

GUIDED NEAR FIELD COMMUNICATION FOR SHORT RANGE DATA COMMUNICATION

CLAIM OF PRIORITY UNDER 35 U.S.C. 119 (E)

The present application claims priority to and incorporates by reference U.S. Provisional Application No. 62/217,594, filed 11 Sep. 2015, entitled "Guided" NFC for short-range Data-communication."

FIELD OF THE INVENTION

This invention generally relates to the use of near field communication (NFC) in place of physical/ohmic contacts for communication among system modules.

BACKGROUND OF THE INVENTION

Near Field Communication (NFC) is a wireless technology allowing two devices to communicate over a short distance of approximately 10 cm or less. Various protocols using NFC have been standardized internationally within NFC Forum specifications and defined in ISO/IEC 18092, ECMA-340, and ISO 14443, for example. NFC allows a mobile device to interact with a subscriber's immediate environment. With close-range contactless technology, mobile devices may be used as credit cards, to access public transportation, to access secured locations, and many more applications. Contactless systems are commonly used as access control ID's (e.g. employee badges), as well as payment systems for public transportation etc. More recently, credit cards are beginning to include NFC capability.

Permittivity is a material property that expresses a measure of the energy storage per unit meter of a material due to electric polarization $(J/V^2)/(m)$. Relative permittivity is the factor by which the electric field between the charges is decreased or increased relative to vacuum. Permittivity is typically represented by the Greek letter c. Relative permittivity is also commonly known as dielectric constant.

Permeability is the measure of the ability of a material to support the formation of a magnetic field within itself in response to an applied magnetic field. Magnetic permeability is typically represented by the Greek letter μ.

A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the relative permittivity (∈Γ). The term insulator is generally used to indicate electrical obstruction while the term dielectric is used to indicate the energy storing capacity of the material by means of polarization.

BRIEF DESCRIPTION OF THE DRAWINGS

Particular embodiments in accordance with the invention will now be described, by way of example only, and with reference to the accompanying drawings.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

As mentioned above, Near Field Communication (NFC) is a short-range wireless connectivity technology that uses magnetic field induction to enable communication between devices when they're touched together, or brought within a few centimeters of each other. Several communication protocols using NFC have now been standardized, such as ISO/IEC 18092, ECMA-340, and ISO 14443, for example. The various standards specify a way for the devices to establish a peer-to-peer (P2P) network to exchange data.

Contactless systems are commonly used as access control ID's (e.g. employee badges), as well as payment systems for public transportation etc. More recently, credit cards are beginning to include NFC capability. However, waves in open space propagate in all directions, as spherical waves. In this way, in the far field, they lose their power proportionally to the square of the distance; that is, at a distance R from the source, the power is the source power divided by $R^2$. Such random wave propagation may also result in interference to other systems that are located nearby and be in violation of emission limits set by standard bodies such as FCC.

A dielectric field confiner may be used to confine the wave to propagation in one dimension, so that under ideal conditions the wave loses no power while propagating. A NFC field confiner (FC) may be used as a medium to communicate between modules in a system, for example. The FC may be a simple block of dielectric selected to have a high permittivity or a high permeability in order for it to confine NFC energy by reducing the wavelength of the radiated energy.

A NFC field container may also be constructed from a metamaterial. Metamaterials are smart materials engineered to have properties that have not yet been found in nature. They are made from assemblies of multiple elements fashioned from composite materials such as metals or plastics. The materials are usually arranged in repeating patterns, at scales that are smaller than the wavelengths of the phenomena they influence. Metamaterials derive their properties not from the properties of the base materials, but from their newly designed structures. Metamaterials are now well known and need not be described further herein; see, e.g. "Metamaterials". Wikipedia, as of Dec. 2, 2015, which is incorporated by reference herein.

Using NFC coupling with a FC to distribute signals between various modules may provide a low cost interconnect solution. Embodiments of this disclosure provide a way to interface removable system modules without using physical/ohmic contacts.

Figure 1:
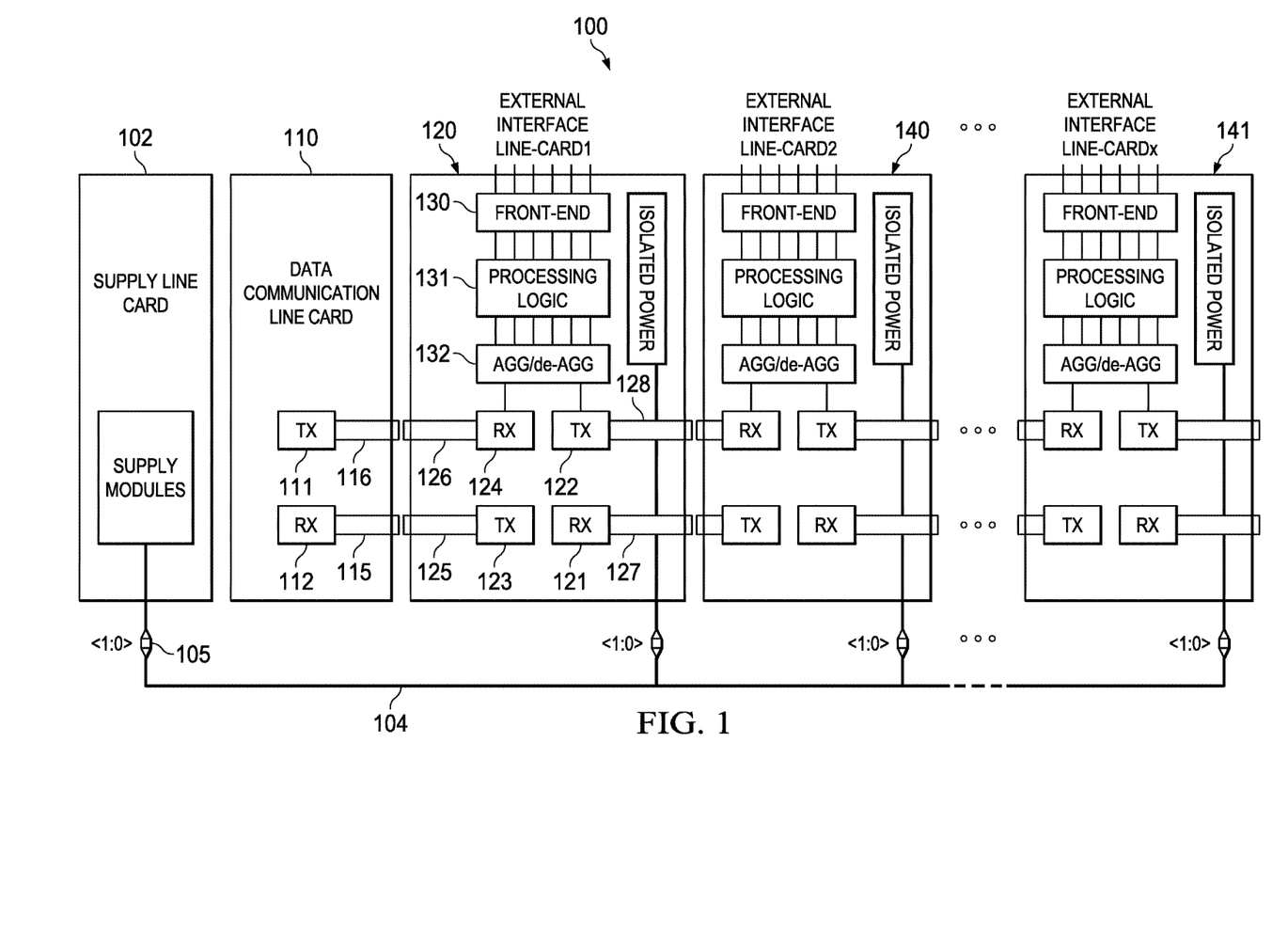
FIG. 1 is a block diagram of an exemplary system that uses guided NFC communication between modules.

FIG. 1 is a block diagram of an exemplary programmable logic controller 100 that uses guided NFC communication between modules. A programmable logic controller (PLC), or programmable controller, is a digital computer used for automation of typically industrial electromechanical processes, such as control of machinery on factory assembly lines, amusement rides, light fixtures, etc. PLCs are used in many machines, in many industries. PLCs are designed for multiple arrangements of digital and analog inputs and outputs, extended temperature ranges, immunity to electrical noise, and resistance to vibration and impact. Programs to control machine operation are typically stored in battery-backed-up or non-volatile memory. A PLC is an example of a "hard" real-time system since output results must be produced in response to input conditions within a limited time, otherwise unintended operation will result. PLC systems are well known and need not be described in detail herein; e.g. see: "Programmable Logic Controller", Wikipedia, as of Dec. 1, 2015, which is incorporated by reference herein.

In this example, there are several modules that will be referred to as "line cards". Various types of line cards may be installed in a chassis or rack and configured for various purposes, such as: to control manufacturing processes, to control the heating and cooling in a building, to control medical equipment, etc. As such, electrical isolation is often needed or desirable to prevent ground loops or other interactions between various pieces of equipment that are being controlled. In the past, various types of isolation devices have been used, such as: optical isolators, transformers, etc.

In this example, there is a power supply line card 102, a data communication line card 110, and several processing line cards 120, 140, 141. While five line card modules are illustrated in FIG. 1, a typical chassis may accommodate ten or more modules. While a system using line cards is illustrated herein, embodiments of the disclosure are not limited to line cards. Various types of modules may make use of the communication techniques explained herein in order to provide reliable communication between removable modules.

In this example, supply line card 102 is coupled to a source of power and in-turn may produce one or more voltages that may be distributed via a bus 104 that may be coupled to each of the line cards via connectors such as connector 105. Typically, voltage bus(es) 104 may be included in a backplane that provides support for the connectors 105.

Data communication line card 110 may be configured to send and receive data via a communication channel to a remote host or another rack or chassis, for example. Various types of communication line card 110 may accommodate a wireless or wired interface. For example, an internet connection to a local or a wide area net may be provided by line card 110. Alternatively, a wireless connection to a Wi-Fi network or to a cellular network may be provided by line card 110.

Processing line card 120 may include, front end interface logic 130, processing logic 131, and aggregator logic 132, for example. Front end interface logic 130 may be of various types to provide interconnection to equipment that is being controlled, such as: input and output signals, RS232/422/485 compatible signals, digital signals, analog signals, etc. Various types of logic may be provided, such as: analog to digital converters (ADC), digital to analog converters (DAC), relays, contacts, etc. Processing logic 131 may include various types of hardwired and programmable logic, microcontrollers, microprocessors, memory, etc. Line cards 140, 141, etc may be identical or similar to line card 120 and may include various types and combinations of processing and interface logic as needed for a given control task.

In this example, each line card is configured to allow it to communicate with its nearest neighbor on both sides. For example, line card 110 may transmit via transmitter 111 to line card 120 which has a receiver 124. Similarly, line card 120 may transmit via transmitter 123 to receiver 115 on line card 110. At the same time, line card 120 may transmit via transmitter 122 to adjacent line card 140 and receive via receiver 121 from adjacent line card 140.

In a similar manner, each line card in system 100 may communicate with each other line card in a daisy chain manner. Each line card includes an aggregator/de-aggregator logic function, such as 132 on line card 120, that allows each line card to recognize communication on the daisy chain intended for it. The aggregator/de-aggregator function also allows a line card to originate a communication packet that is then provided to the daisy chain and then propagated through adjacent line cards to a final destination on a target line card. In this embodiment, the daisy chain operates in a similar manner to an internet network protocol and each aggregator 132 functions as an internet interface. In another embodiment, a different type of known or later developed peer to peer protocol may be used.

As mentioned above, NFC may be used as the transport vehicle to communicate between each adjacent line card. As will be described in more detail below, FC segments, such as FC 115, 225 and 116, 126 may be used to guide the NFC between each adjacent line card module in order to minimize signal spreading and interface to other systems and devices.

Figure 2:
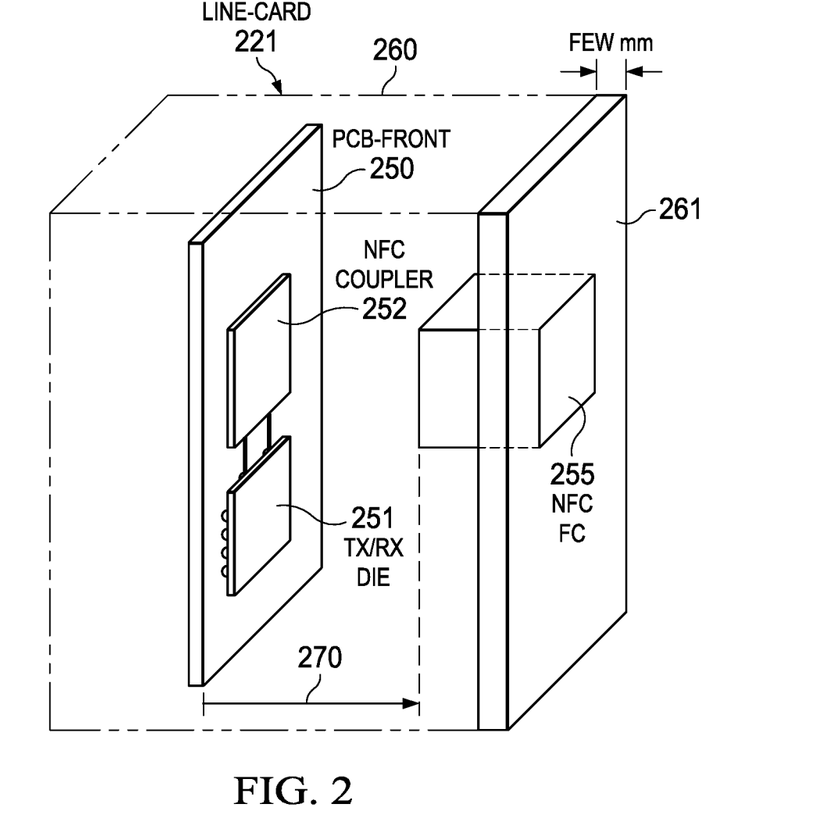
FIGS. 2-6 are more detailed illustrations of modules for the system of FIG. 1.
Figure 3:
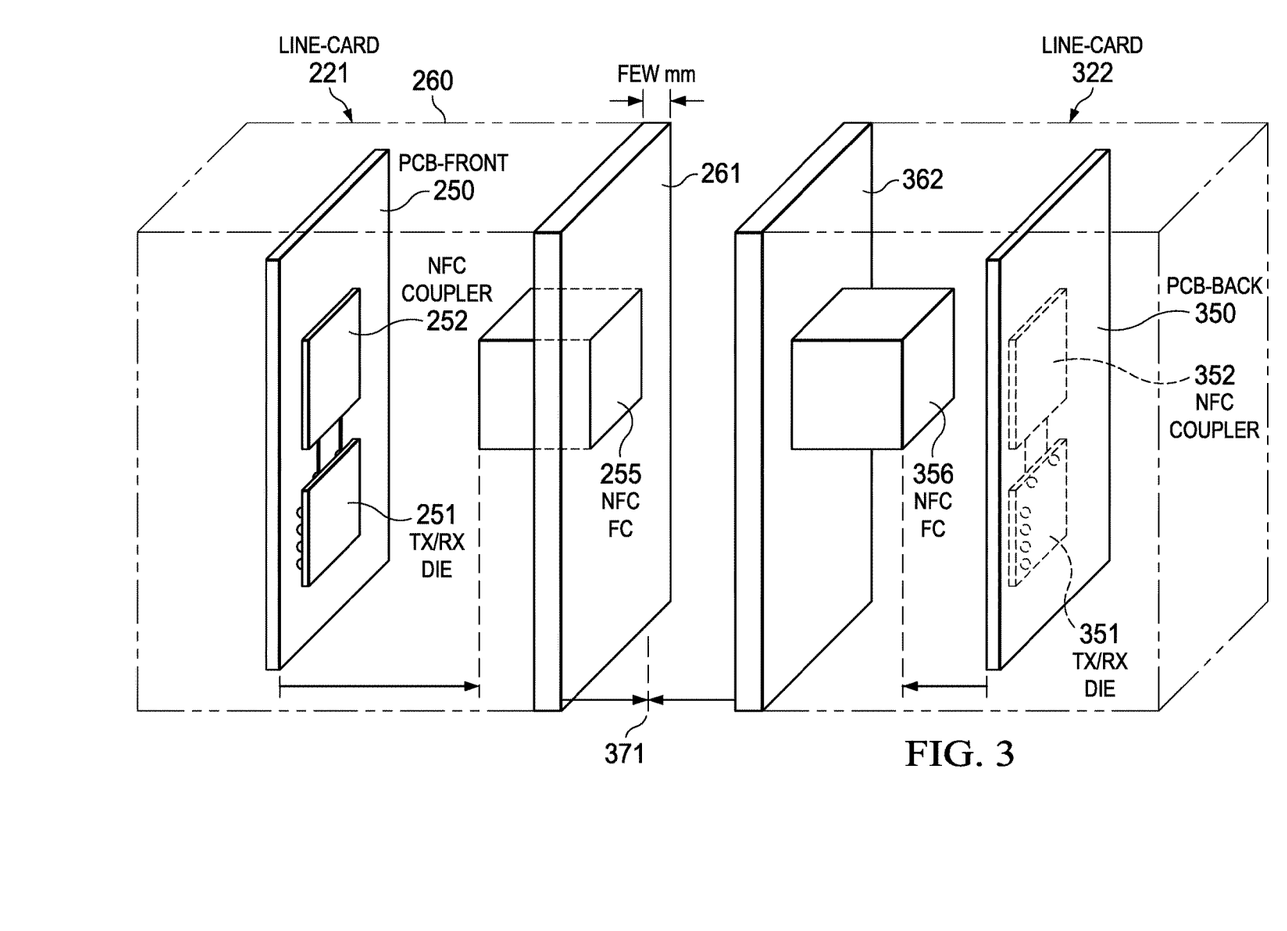

FIGS. 2 and 3 are more detailed illustrations of modules for the system of FIG. 1. FIG. 2 illustrates an example line card module 221 that is representative of the various modules 110, 120, 140, etc of system 100. Module 221 may include a substrate 250 on which are mounted various circuit components, such as an integrated circuit (IC) 251 that includes transmitter(s) and receivers(s), such as transmitter 123 and receiver 124 and/or transmitter 122 and receiver 121, of line card 120, for example. In some embodiments, there may be a separate IC for each transmitter and receiver. In another embodiment, one or more receivers and transmitters may be formed in a single IC, for example.

Integrated circuit 251 may also include aggregation logic, processing logic and front end logic, or there may be additional ICs mounted on substrate 250 that contain aggregation logic, processing logic, and front end logic. Substrate 250 may be a single or a multilayer printed circuit board, for example. IC 251 and other ICs may be mounted on substrate 250 using through hole or surface mount technology using solder bumps or bonding depending on the frequency of operation, or other known or later developed packaging technologies. Substrate 250 may be any commonly used or later developed material used for electronic systems and packages, such as: fiberglass, plastic, silicon, ceramic, Plexiglas, etc., for example.

Substrate 250 also contains an NFC coupler 252 that is connected to the receiver and/or transmitter that is contained within IC 251. NFC coupler 252 can also be coupled to the receiver and/or transmitter that are contained within IC 251. NFC coupler 252 will be described in more detail below. The coupler may be a separate structure that is mounted on substrate 250, or it may be embedded within substrate 250. Embodiments of the disclosure may operate in near field mode in which the separation between adjacent modules is a fraction of the wavelength of the frequency being transmitted by the transmitter(s) in IC 251. For example, transmission frequencies in a range of 10 GHz to 30 GHz may be used. However, some embodiments may use frequencies that are higher or lower than this range.

Near field mode may produce an evanescent field that may be used to couple two adjacent NFC couplers. Evanescent fields by nature exhibit an exponential decay with distance away from surface. By virtue of near proximity between NFC coupler 252 and another NFC coupler in an adjacent module that is only a few mm's away, enhanced by FC 255, a reasonable TX-to-RX signal coupling may be achieved using the evanescent field in near field mode while mitigating emission limits/concerns outlined per FCC Part 15.

The best analogy would be that of a transformer. A strong self-coupling between coils results in reduced leakage to the external world. Furthermore, any leakage may be considered un-intentional. The requirements for un-intentional radiation per FCC is greatly relaxed compared to those for intentional emissions.

Module 221 may be enclosed in a housing that is roughly indicated at 260. One side of the housing is illustrated as panel 261, which may be metal or plastic, for example. Typically, the housing will be a few mm thick.

An NFC field confiner 255 may be mounted to panel 261 in a position that places it approximately centered over and adjacent NFC coupler 252 when housing 253 is assembled, as indicated by motion vector 270. When housing 260 is assembled, a top surface of NFC coupler 252 will be positioned immediately adjacent a bottom surface of field confiner 255, as indicated by vector 270. In this manner, a majority of the electromagnetic energy that is emanated by NFC coupler 252 will be captured and confined by field confiner 255 and thereby directed to an adjacent module with minimal external radiation and signal loss. Field confiner 255 may also increase the field strength of the evanescent field produced by NFC coupler 252. Field confiner 255 may also reduce radiation leakage and thereby contribute to FCC (Federal Communication Commission) compliance. Operation in the 10-30 GHz region produces cm/mm-wave frequencies that allow for relaxed spatial alignment tolerance between NFC coupler 252 and NFC field confiner 255.

Field confiner 255 may be a dielectric block, for example. Electromagnetic wave propagation through the dielectric block may be described by the wave equation, which is derived from Maxwell's equations, and where the wavelength depends upon the structure of the dielectric block, and the material within it (air, plastic, vacuum, etc.), as well as on the frequency of the wave. Field confiner 255 may be able to confine the field emitted by NFC coupler by having a permittivity and/or permeability that is significantly greater than surrounding materials and/or air which will significantly reduce the wavelength of the electromagnetic field emitted by NFC coupler 252. Similarly, field confiner 255 may be able to confine the field emitted by NFC coupler by having a permittivity and/or permeability that is significantly lower than surrounding materials and/or air which will significantly increase the wavelength of the electromagnetic field emitted by NFC coupler 252. Alternatively, field confiner 255 may be constructed from a metamaterial that causes a significant reduction or increase in wavelength of the electromagnetic field emitted by NFC coupler 252.

For example, field confiner 255 may be a dielectric block that has a relative permittivity greater than approximately 2.0. Similarly, field confiner 255 may be a dielectric block that has a relative permeability greater than approximately 2.0.

In another embodiment, field confiner 255 may have a conductive layer around the periphery to further confine and direct an electromagnetic field radiated by NFC coupler 252. The conductive layer may use a metallic or non-metallic conductive material to form sidewalls around confiner 255, such as: metals such as copper, silver, gold, etc., a conductive polymer formed by ionic doping, carbon and graphite based compounds, conductive oxides, etc., for example.

Depending on the material and thickness of module wall 261, field confiner 255 may be simply mounted to the inside surface of module wall 261 such that the radiated signal passes through module wall 261. In some embodiments, a window may be provided in module wall 261 so that an outer surface of field confiner 255 may be mounted flush, slightly indented, or slightly proud of an outside surface of module wall 261, for example. The general location on the surface of the housing where the field confiner is located will be referred to herein as a "port".

In another embodiment, field confiner 255 may be mounted directly on substrate 250 such that it covers over NFC coupler 252 and is configured to span between the substrate and side panel 261 when housing 260 is assembled.

FIG. 3 illustrates a portion of a second module 322 that may be located adjacent module 221. Module 322 may have a housing that includes a panel 362, that will be referred to as a "left" panel. Module 221 may have a panel 261 that will be referred to as a "right" panel. Module 322 may include a substrate 350 that holds various ICs, such as IC 351 that may include a receiver and transmitter, and an NFC coupler 352 that may be similar to coupler 252, referring back to FIG. 2. Module 322 may also include a field confiner 356 that is mounted on left panel 362 and in alignment with the NFC coupler on substrate 350.

When module 221 and module 322 are installed in a chassis, right panel 261 will be in close proximity to left panel 362, as indicated at 371. Field confiner 255 of module 221 and field confiner 355 of module 322 are configured so that they are in approximate alignment with each other. In this manner, a signal that is generated by a transmitter in IC 251 may be provided to coupler 252, radiated into field confiner 255 and thereby directed to field confiner 356 and then received by coupler 352 on substrate 350 and thereby provided to a receiver in IC 351.

Module 221 or 322 may be easily removed from or inserted into a chassis without any wear and tear on contacts that were previously required to communicate signals between modules. Furthermore, dielectric field confiners 255, 356 provide complete electrical isolation between module 221 and module 322. An additional isolation mechanism is not required.

Figure 4:
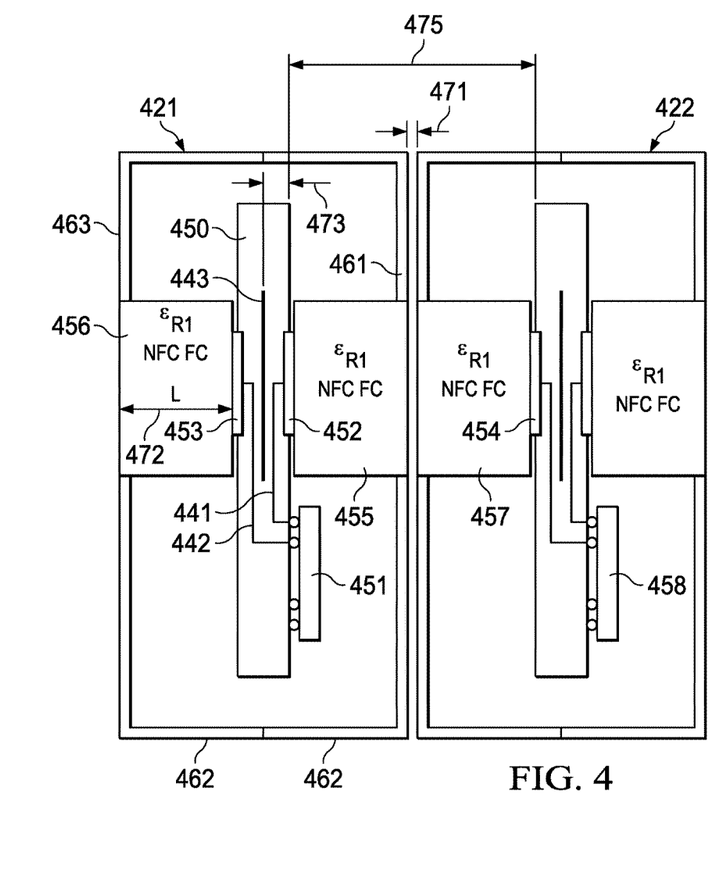

FIG. 4 is a more detailed illustration of two modules 421, 422 that are similar to modules 221, 322 of FIG. 3. This view is representative of a cross sectional view of the modules looking towards the backplane. In this example, modules 421, 422 are packaged in plastic housings that each may be formed as two "clam shells" as indicated at 462. While two package elements are illustrated here, other embodiments may be assembled using various configurations of packaging that may have more than two parts, for example.

Each module may have one, or more, substrates, such as substrate 450. In this example, substrate 450 is a multilayer printed wiring board (PWB); however, other embodiments may use two PWBs mounted back to back, for example. One or more ICs 451 are mounted on substrate 450 and contain the transmitter and receiver, as described above in more detail. Processing logic and aggregator logic may also be included in the one or more ICs 451. A "left" NFC 453 is formed on the left surface of substrate 450 and a "right" NFC coupler 452 is formed on the right surface of substrate 450. Left NFC coupler 453 may be coupled to a receiver in IC 451 via a microstrip 462 formed on one or more layers of substrate 450. Similarly, right NFC coupler 452 may be coupled to transmitter in IC 451 via a microstrip 461 formed on one or more layers of substrate 450. The microstrips may be single ended or differential, as will be described in more detail below.

A shield 463 may be provided between left NFC coupler 453 and right NFC coupler 452 to minimize "back scatter" of the field produced by each NFC coupler. Shield 463 may be a conductive layer, for example, that is connected to a ground reference for the module. Shield 463 is spaced apart from each coupler 452, 453 by a distance greater than lambda/10, where lambda is the wavelength of the signal being emitted by the couplers, in order to avoid capacitance effects that may reduce the bandwidth of the coupler. For example, the wavelength of a 30 GHz signal in a dielectric having an $\epsilon_R$ of 1 is approximately 10.0 mm. In this example, substrate 450 is a typical PWB material that has an $\epsilon_R$ of approximately 1.0. Therefore, as long as the shield is spaced away from each coupler by a distance 473 of at least 1 mm, then capacitance effects should be minimized in a system operating at 30 GHz. Lower frequency operation may require larger spacing.

As discussed above, NFC field confiner 455, 456 may be positioned above each NFC coupler 452, 453 and operates to confine a majority of the field radiated from each coupler. In this example, each NFC field confiner is a simple block of dielectric material, which will be referred to as a "dielectric field confiner" (DFC) herein. Common dielectric materials have a relative permittivity ($\epsilon_R$) of approximately 2-3, for example. The exact size of the block is not critical.

When module 421 and module 422 are placed adjacent to each other, the NFC port of module 421 formed by NFC coupler 452 and DFC 455 and the NFC port of module 422 formed by NFC coupler 454 and DFC 457 will form an electro-magnetic (EM) coupling that allows a signal generated by a transmitter in IC 451 to be EM coupled from NFC coupler 452 to NFC coupler 454 via DFC 455 and 457 and then provided to a receiver in IC 458. A similar process may be used to transmit a signal from a transmitter in IC 458 to a receiver in IC 451 by using a second set of NFC couplers or by sharing NFC couplers 452, 454.

In this example, the DFC protrude through an opening in the housing wall and the outside surface edge of DFC 455 and 457 are flush with the outside surface of the housing, such that the gap 471 between housings of module 421 and 422 determines the gap between DFC 455 and 457. Minimizing the gap will minimize the amount of radiated energy the escapes while crossing the gap.

Figure 5:
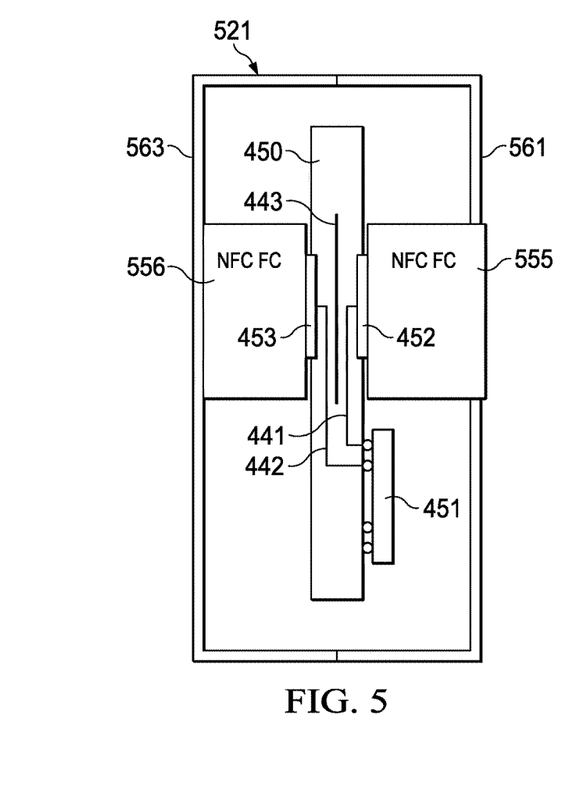

FIG. 5 illustrates another embodiment of a module 521 in which NFC field confiner 555 stops at the inside surface of module housing panel 561. In this example, the dielectric characteristics of housing panel 561 may be chosen to be approximately equal to the dielectric characteristics of NFC field confiner 556, for example.

Alternatively, the outside surface of the NFC field containers may stand proud of the outside surface of the housing panel, such as illustrated by field confiner 555 standing proud of housing panel 561. In this manner, the gap between adjacent NFC field containers may be reduced.

Figure 6:
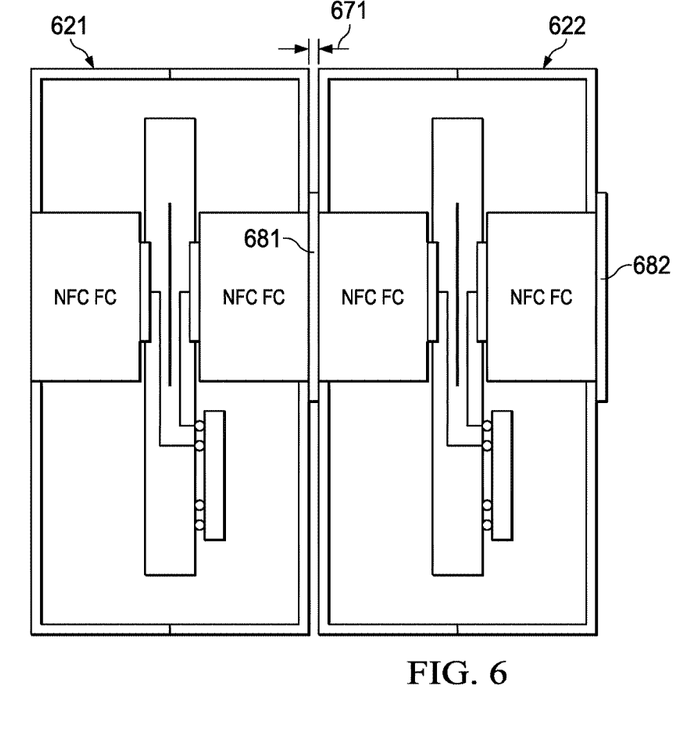

FIG. 6 illustrates another option in which a flexible, non-conducting layer 681, 682 may be added to one or both surfaces of adjoining NFC field confiners of modules 621, 622 in order to fill the gap 671 between modules 621, 622. An example of a rubbery material with dielectric constant 2.5 to 3.5 is Silicone. Other materials with similar characteristics that may be used fall into two types: unsaturated rubber and saturated rubber.

Unsaturated rubbers include: Synthetic polyisoprene, Polybutadiene, Chloroprene rubber, Butyl rubber, Halogenated butyl rubbers, Styrene-butadiene Rubber, Nitrile rubber, Hydrogenated Nitrile Rubbers, etc, for example.

Saturated rubbers include: EPM (ethylene propylene rubber), EPDM rubber (ethylene propylene diene rubber), Epichlorohydrin rubber (ECO) Polyacrylic rubber (ACM, ABR), Silicone rubber (SI, Q, VMQ), Fluorosilicone Rubber (FVMQ, Fluoroelastomers (FKM, and FEPM) Viton, Tecnoflon, Fluorel, Perfluoroelastomers (FFKM) Tecnoflon PFR, Kalrez, Chemraz, Perlast, Polyether block amides (PEBA), Chlorosulfonated polyethylene (CSM), (Hypalon), Ethylene-vinyl acetate (EVA), etc, for example.

Figure 7:
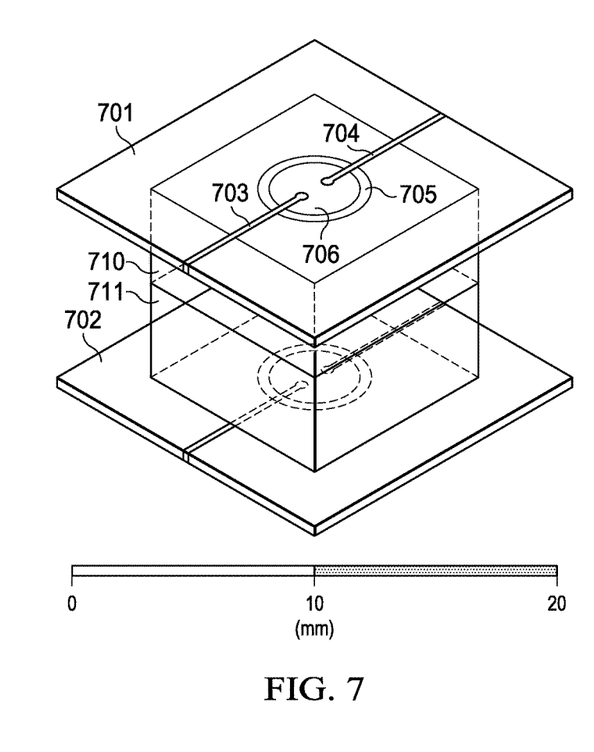
FIGS. 7-9 are illustrations of exemplary guided NFC structures.
Figure 8A:
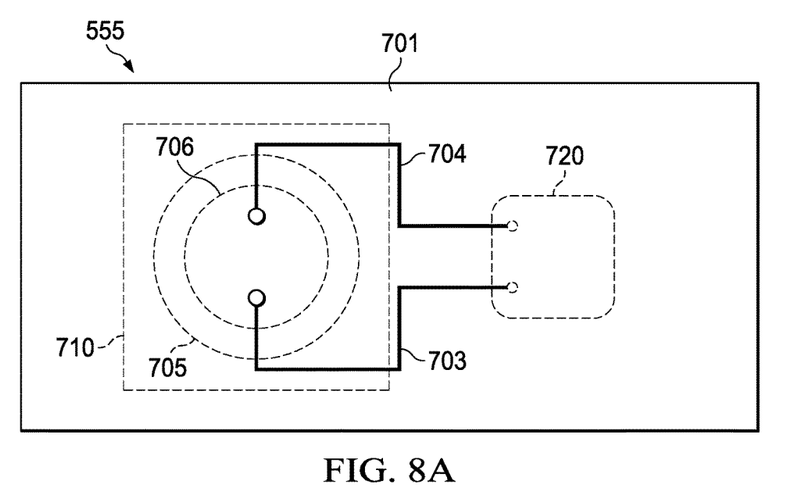
Figure 8B:
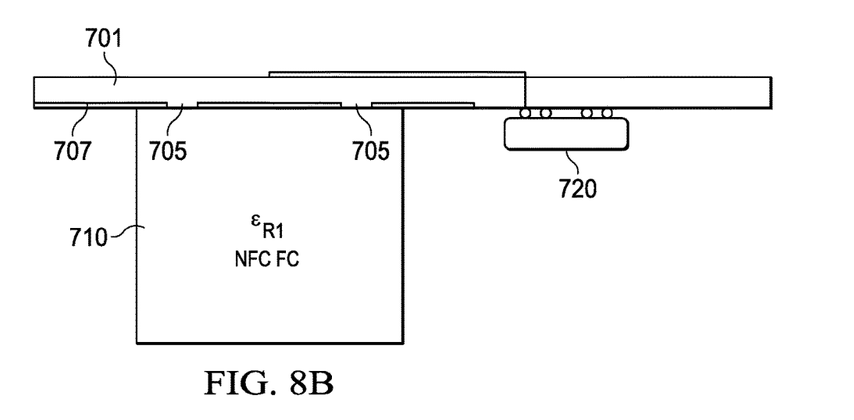

FIGS. 7 and 8A, 8B are illustrations of an exemplary guided NFC coupler structure. FIG. 7 is a transparent pictorial view of substrates 701, 702 in two adjacent modules, while FIG. 8A is a top view and FIG. 8B is an edge view of substrate 701. Substrate 701 is representative of a portion of a substrate in one module on which an NFC field coupler is formed, such as substrate 450 in module 421 of FIG. 4, for example. Substrate 702 is representative of a portion of another substrate in an adjacent module on which a matching NFC field coupler is formed, such as the substrate in module 422, for example. NFC field confiner 710 is positioned adjacent substrate 701 and roughly aligned with the NFC field coupler formed thereon. NFC field confiner 711 is positioned adjacent substrate 702 and roughly aligned with the NFC field coupler formed thereon.

In this example, at least a portion of the bottom side of substrate 701 is covered by a conductive layer, such as a copper layer. The NFC field coupler is formed by etching a circular slot 705, leaving the conductive outer portion 707 and a conductive inner portion 706. On the top side of substrate 701, microstrip lines 703, 704 are arranged to bring a differential signal generated by a transmitter that is mounted on the substrate, as described in more detail above. Microstrip lines 703, 704 pass over slot 705 and terminate over conductive inner portion 706. This arrangement will excite a traveling wave mode that goes around in a circle on the slot 705 in response to an RF signal on microstrip lines 703, 704. This configuration will excite a wide band field structure with a large near field that will extend in a perpendicular direction from the slot structure. In another embodiment, the top and bottom layers of substrate 701 may be reversed.

A mirror image structure is formed in substrate 702 and will couple with the large near field produced by slot 705. Field confiners 710, 711 act to confine the field within the limits of field confiners 710, 711. In this manner, a signal generated by a transmitter 720 mounted on substrate 701 may be EM coupled to a coupling structure on substrate 702 and passed to a receiver mounted on substrate 702 without physical ohmic connectors and with minimal escaped radiation.

Figure 9:
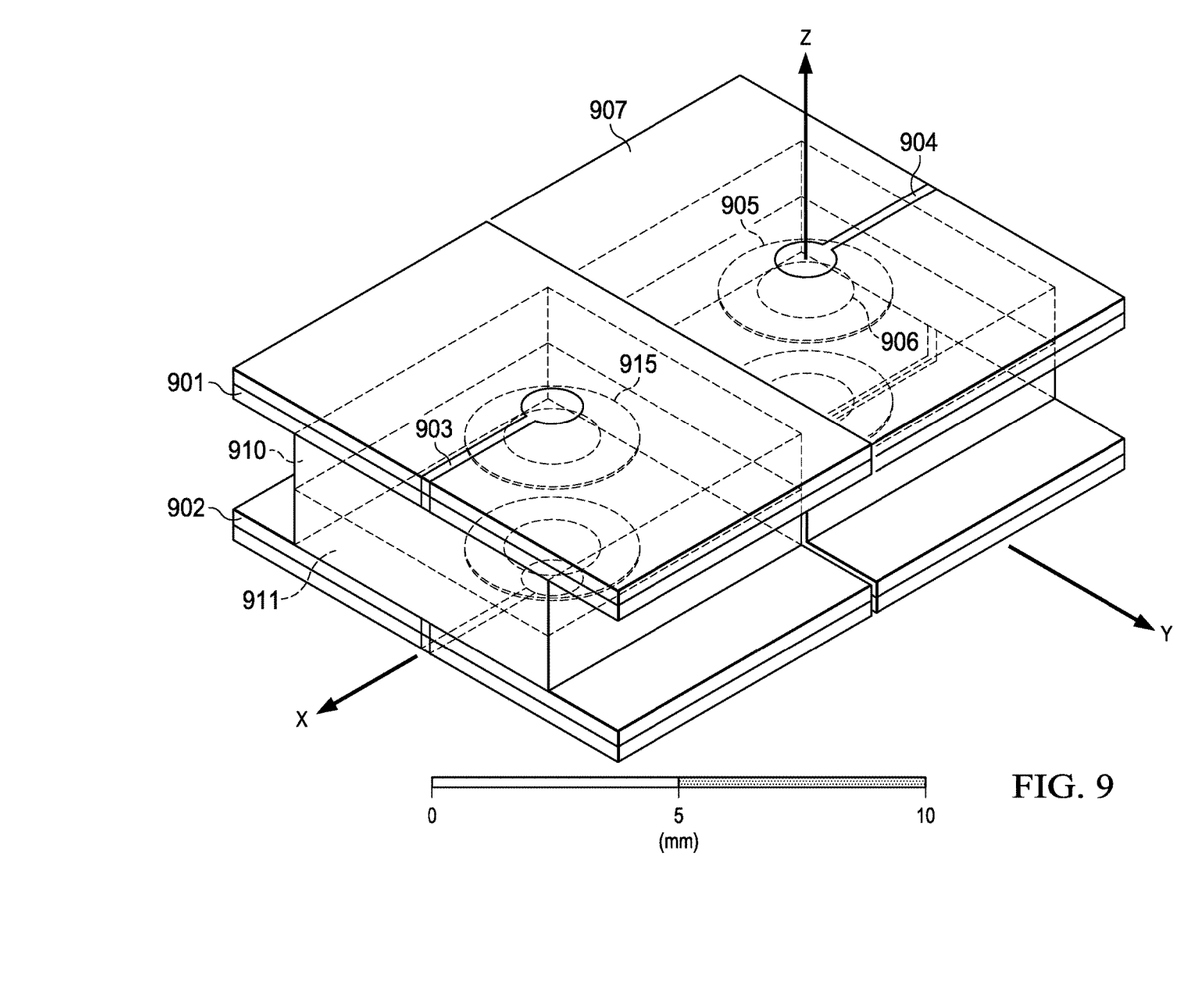

FIG. 9 is a transparent pictorial view of substrates 901, 902 in two adjacent modules. In this example, a single microstrip line 904 on the top surface of substrate 901 is positioned over slot 905 that is formed in a conductive layer on the bottom surface of substrate 901, leaving the conductive outer portion 907 and a conductive inner portion 906. This NFC coupler structure works in a similar manner to the differential structure of FIG. 7 and EM couples to a similar mirror image structure on substrate 902.

In FIG. 9, a second NFC coupler structure 903, 915 is illustrated. In this example, the two structures may be operated in tandem for a differential signal or they be operated separately for two independent channels. For example, one may be used to for transmitting from a transmitter mounted on substrate 901 and the other may be used for transmitting from a transmitter mounted on substrate 902. Furthermore, this simple structure may be repeated several times or hundreds of times to create tens or hundreds of channels. A single contiguous NFC field confiner 910, 911 on each module may be used to confine the fields produced by all of these co-located NFC couplers.

Figure 10:
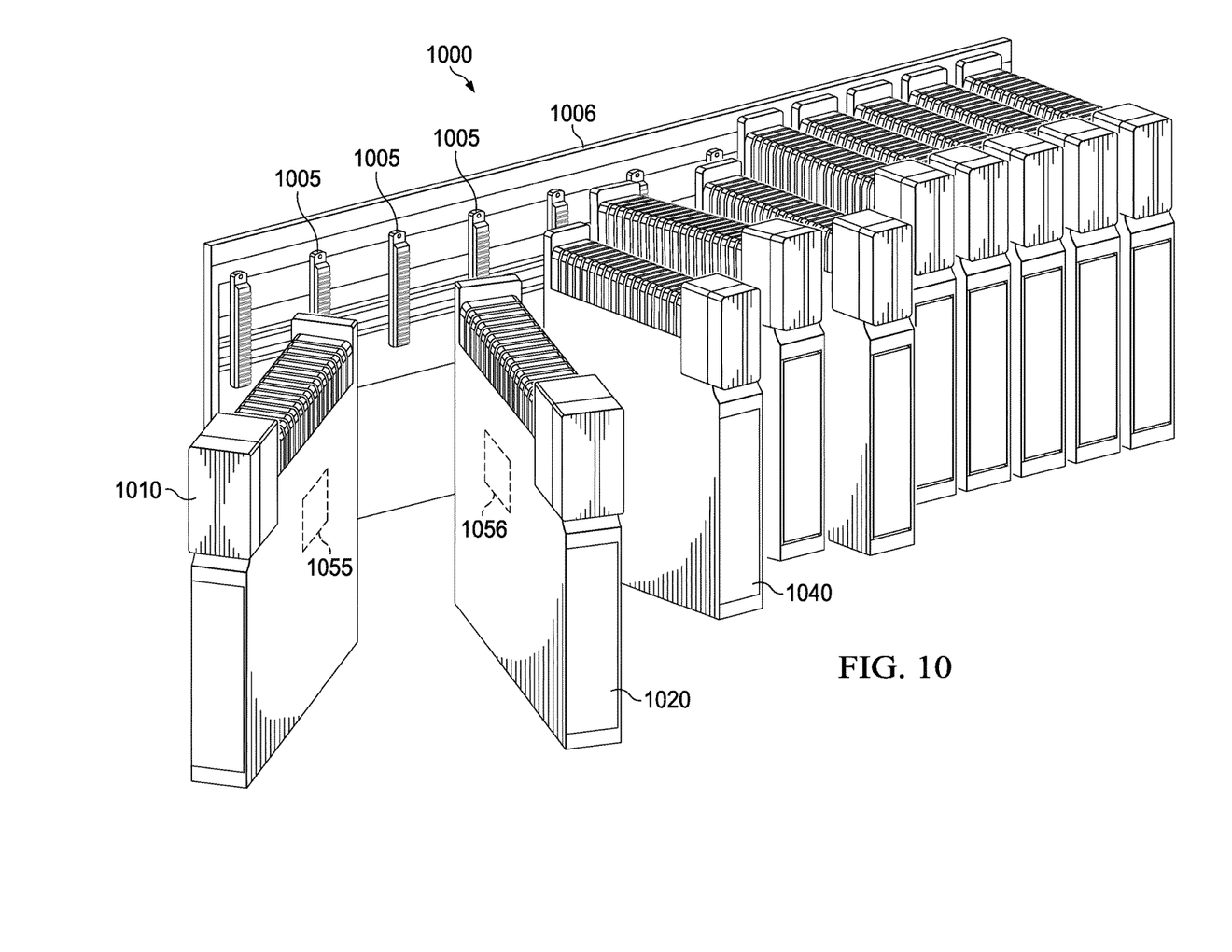
FIG. 10 is a pictorial illustration of the exemplary system of Figure.

FIG. 10 is a pictorial illustration of an exemplary system 1000 that is another view of system 100 of FIG. 1. Backplane 1006 provides a set of connectors 1005 for providing power to each line card, as explained with regard to connector 105 of FIG. 1. As can be seen by the illustration, each line card module is removable from backplane 1006 by simply pulling the module to disconnect it from connector 1005. Typically, a rack or chassis will also be provided along with backplane 1006 to support the line cards when they are inserted into connectors 1005.

Each line card module is enclosed in a housing, which may be made from plastic or other suitable materials. As described in more detail above, each line card may have a NFC coupler and field confiner arranged to form a contactless communication port on each side of the module. For example, module 1010 may have a port 1055 on the right side of the module while module 1020 may have a port 1056 on the left side of the module that aligns with port 1055 when both modules are plugged into backplane 1006.

Similarly, module 1020 may have another port (not shown) on the right side of the module while module 1040 may have a port (not shown) on the left side of the module that aligns when both modules are plugged into backplane 1006. All of the modules may have similar pairs of ports on both sides of each module to allow daisy chained communication among all of the modules, as described in more detail above.

Figure 11:
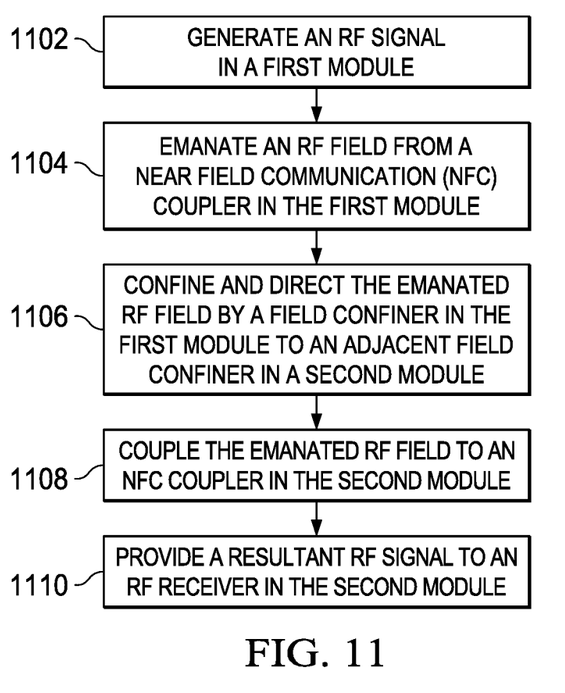
FIG. 11 is a flow chart illustrating operation of NFC between adjacent modules.

FIG. 11 is a flow chart illustrating operation of near field communication between modules, as described above in more detail. As described above in more detail, the modules may be part of a programmable logic control system used for industrial, commercial, and residential applications. A typical system may include a rack or chassis into which a set of modules are installed. Each module may communicate with an adjacent neighbor module using near field communication, in which an RF signal generated in one module may be EM coupled to a receiver in an adjacent module using radiative coupling, near field coupling, or evanescent coupling, or any combination of these modes.

For example, a radio frequency (RF) signal may be generated 1102 in a first module. In the example of FIGS. 1-10, the RF signal may have a frequency in the range of 10-30 GHz. However, other systems may use RF signals at a higher or lower frequency by adjusting the physical size of the field coupling and field confining components described herein.

An RF electromagnetic field may be emanated 1104 in response to the RF signal from a first near field communication (NFC) coupler in the first module. The RF electromagnetic field may be the result of a traveling wave formed in a circular slot in a conductive layer, for example, as described in more detail with regard to FIGS. 7-9.

The emanated RF electromagnetic field is confined and directed 1106 by a field confiner in the first module to a field confiner in a second module located adjacent the first module. As described in more detail above, the two field confiners are located in close proximity when the modules are installed in a system and thereby minimize loss of emanated energy to the surroundings. This may simplify the process of complying with FCC emission requirements, for example.

The emanated RF electromagnetic field is then coupled 1108 to a second NFC coupler in the second module. As described above in more detail, this coupling is performed by EM coupling and may use the near field of the emanated electromagnetic field. This coupling may also make use of radiated energy that is propagated from the NFC coupler to the second NFC coupler. The coupling may also make use of an evanescent field that is formed by the first NFC coupler. Depending on the spacing between the adjacent modules, one or the other or a combination of these coupling modes may occur.

A resultant RF signal may then be provided 1110 to an RF receiver on the second module. As described above in more detail, the multiple modules in the system may communicate in a daisy chained manner such that any module may be able to communicate with any other module in the system.

A known standard communication protocol, such as the Internet Protocol (IP) may be used, treating the daisy chained NFC physical media as an Ethernet. The Internet Protocol (IP) is the principal communications protocol in the Internet protocol suite for relaying datagrams across network boundaries. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information. The first major version of IP, Internet Protocol Version 4 (IPv4), is the dominant protocol of the Internet. Its successor is Internet Protocol Version 6 (IPv6).

Another embodiment may use another known or later developed communication protocol for communication using the daisy chained NFC physical media as described herein.

In this manner, embodiments of the present disclosure may provide high throughput communication between removable modules of a system using near field communication techniques. The techniques described herein may be less expensive than alternatives such as optical couplers, for example. NFC allows contactless communication between modules and thereby eliminates the need for additional isolation in systems that may require isolation between modules.

Other Embodiments

While the invention has been described with reference to illustrative embodiments, this description is not intended to be construed in a limiting sense. Various other embodiments of the invention will be apparent to persons skilled in the art upon reference to this description. For example, while a programmable logic controller system was described, other types of modular systems may embody aspects of the present disclosure in order to improve reliability.

While modules in which the guided NFC ports are located on the side of the module were described herein, in another embodiment a port may be located on an edge of a module with a mating port located on a backplane or other surface that is adjacent to the edge of the module, for example.

While a daisy-chained communication configuration was described herein, in another embodiment other topologies may be formed. For example, a tree topology may be formed by providing a port on the backplane that mates with an edge mounted port in each module.

While a simple dielectric block has been described herein, another embodiment may use a metallic or non-metallic conductive material to form sidewalls on the field confiner, such as: a conductive polymer formed by ionic doping, carbon and graphite based compounds, conductive oxides, etc., for example.

A dielectric or metamaterial field confiner may be fabricated onto a surface of a substrate or module panel using an inkjet printing process or other 3D printing process, for example.

While field confiners with polymer dielectric cores have been described herein, other embodiments may use other materials for the dielectric core, such as ceramics, glass, etc., for example.

While dielectric cores with a square cross section are described herein, other embodiments may be easily implemented. For example, the dielectric core may have a cross section that is rectangular, trapezoidal, cylindrical, oval, or many other selected geometries.

The dielectric core of the conductive waveguide may be selected from a range of approximately 2.4-12, for example. These values are for commonly available polymer dielectric materials. Dielectric materials having higher or lower values may be used when they become available.

While sub-terahertz signals in the range of 10-30 GHz were discussed herein, NFC couplers and FCs and systems for distributing higher or lower frequency signals may be implemented using the principles described herein by adjusting the physical size of the field confiner core accordingly.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A system comprising a first module, in which the module includes:
    a substrate on which is mounted a radio frequency (RF) transmitter coupled to a first near field communication (NFC) coupler located on the substrate;
    a housing that surrounds and encloses the substrate, the housing having a first port region on a surface of the housing; and
    a first field confiner located between the first NFC coupler and the first port region on the housing configured to propagate, near-field and/or evanescently couple electromagnetic energy emanated from the first NFC coupler through the first port region;
    in which the substrate has a conductive layer and a signal layer separated by an insulating layer; and
    in which the first NFC coupler includes a portion of the conductive layer in which an approximately circular slot has been removed leaving a circular conductive region and a first signal line on the signal layer that terminates over the circular region, passes over the circular slot, and couples to the transmitter.

2. The system of claim 1, in which the NFC includes a second signal line on the signal layer that terminates over the circular region, passes over the circular slot and couples to the transmitter.

* * * * *